US011281986B2

(12) United States Patent
Hu et al.

(10) Patent No.: US 11,281,986 B2
(45) Date of Patent: *Mar. 22, 2022

(54) ESTIMATING UTILIZATION OF NETWORK RESOURCES USING TIME SERIES DATA

(71) Applicant: Cisco Technology, Inc., San José, CA (US)

(72) Inventors: Hao Hu, San Jose, CA (US); Preethi Natarajan, Los Gatos, CA (US); Nii Ako Ampa-Sowa, San Jose, CA (US); Stephen E. Jerman, Eagle, ID (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,262

(22) Filed: Jun. 26, 2020

(65) Prior Publication Data

US 2020/0327436 A1    Oct. 15, 2020

Related U.S. Application Data

(63) Continuation of application No. 14/699,961, filed on Apr. 29, 2015, now Pat. No. 10,713,578.

(51) Int. Cl.
*G06N 7/00* (2006.01)
*H04L 41/14* (2022.01)
(Continued)

(52) U.S. Cl.
CPC ............. *G06N 7/005* (2013.01); *G06F 17/18* (2013.01); *H04L 41/145* (2013.01); *H04L 43/0876* (2013.01)

(58) Field of Classification Search
CPC ....... G06N 7/005; G06F 17/18; H04L 41/145; H04L 43/0876; H04L 41/147
See application file for complete search history.

(56) References Cited

U.S. PATENT DOCUMENTS 5,884,037 A    3/1999  Aras et al.
6,574,587 B2   6/2003  Waclawski
(Continued)

OTHER PUBLICATIONS

Davis et al., "Structural Breaks Estimation for Non-Stationary Time Series Signals", Jul. 17-20, 2005, IEEE/SP 13th Workshop on Statistical Signal Processing, 2005, pp. 233-238. (Year: 2005).*

(Continued)

*Primary Examiner* — Kamran Afshar
*Assistant Examiner* — Ying Yu Chen
(74) *Attorney, Agent, or Firm* — Polsinelli PC

(57) ABSTRACT

In one implementation, a method includes obtaining time series data. The time serious data includes a plurality of network utilization measurements. The plurality of network utilization measurements is indicative of a plurality of utilizations of one or more resources of a network resource at a plurality of times. The method also includes determining whether the time series data comprises a plurality of segments. Each segment of the plurality of segments is associated with a separate regression model and each segment includes a portion of the time series data. The method further includes identifying a current segment from the time series data when the time series data comprises the plurality of segments. The method further includes determining an estimated network utilization based on a current regression model associated with the current segment.

20 Claims, 6 Drawing Sheets

(51) Int. Cl.
*H04L 43/0876* (2022.01)
*G06F 17/18* (2006.01)

(56) References Cited

U.S. PATENT DOCUMENTS

| | | | |
|---|---|---|---|
| 7,716,011 B2* | 5/2010 | Thibaux | H04L 63/1425 |
| | | | 702/179 |
| 8,015,133 B1 | 9/2011 | Wu et al. | |
| 8,073,436 B2 | 12/2011 | Yaqub et al. | |
| 8,230,061 B2 | 7/2012 | Hassan et al. | |
| 8,234,229 B2 | 7/2012 | Castelli et al. | |
| 8,856,797 B1* | 10/2014 | Siddiqui | G06F 11/34 |
| | | | 718/104 |
| 2006/0010101 A1 | 1/2006 | Suzuki et al. | |
| 2009/0217282 A1 | 8/2009 | Rai et al. | |
| 2016/0034615 A1* | 2/2016 | Heda | G06F 17/18 |
| | | | 703/2 |

OTHER PUBLICATIONS

Hu et al., "Estimating and Forecasting Network Traffic Performance Based on Statistical Patterns Observed in SNMP Data", 2013, P. Perner (Ed.): MLDM 2013, LNAI 7988, pp. 601-615. (Year: 2013).*

Poo KuanHoong, Ian K. T. Tan and CheeYikKeong, "BitTorrent Network Traffic Forecasting with ARMA", Jul. 2012, International Journal of Computer Networks & Communications (IJCNC) vol. 4, No. 4, pp. 143-156. (Year: 2012).

Blake Stimac, "How to set a mobile data limit on your Android phone", May 12, 2014, Greenbot: https://www.greenbot.com/article/2151860/how-to-set-a-mobile-data-limit-on-your-android-phone.html, pp. 1-6. (Year: 2014).

Kejia Hu, Alex Sim, Demetris Antoniades, and Constantine Dovrolis, "Estimating and Forecasting Network Traffic Performance Based on Statistical Patterns Observed in SNMP Data", Jul. 19, 2013, Springer-Verlag Berlin, Heidelberg, Machine Learning and Data Mining in Pattern Recognition, MLDM 2013, p. 601-615.

* cited by examiner

ESTIMATING UTILIZATION OF NETWORK RESOURCES USING TIME SERIES DATA

CROSS-REFERENCE TO RELATED APPLICATION

The instant application is a Continuation of, and claims priority to, U.S. patent application Ser. No. 14/699,961, filed Apr. 29, 2015, the contents of which are herein incorporated by reference in its entirety.

FIELD OF THE INVENTION

The present disclosure relates to utilization of network resources. More specifically, the present disclosures relates to estimating the utilization of network resources.

BACKGROUND

A service provider may be an entity that manages, owns, and/or provides access to resources, networks, and/or services. The service provider may allow client devices (e.g., computing devices such as desktop computers, laptop computers, server computers, etc.) to access and/or use one or more resources, networks, and/or services of the service provider. The service provider may charge fees (e.g., money) for access to and/or use one or more resources, networks, and/or services. For example, the service provider may charge a fee for each computing device that uses a resource. In another example, the service provider may charge a fee for each unit of data (e.g., megabyte, gigabyte, etc.) that is accessed by a client device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
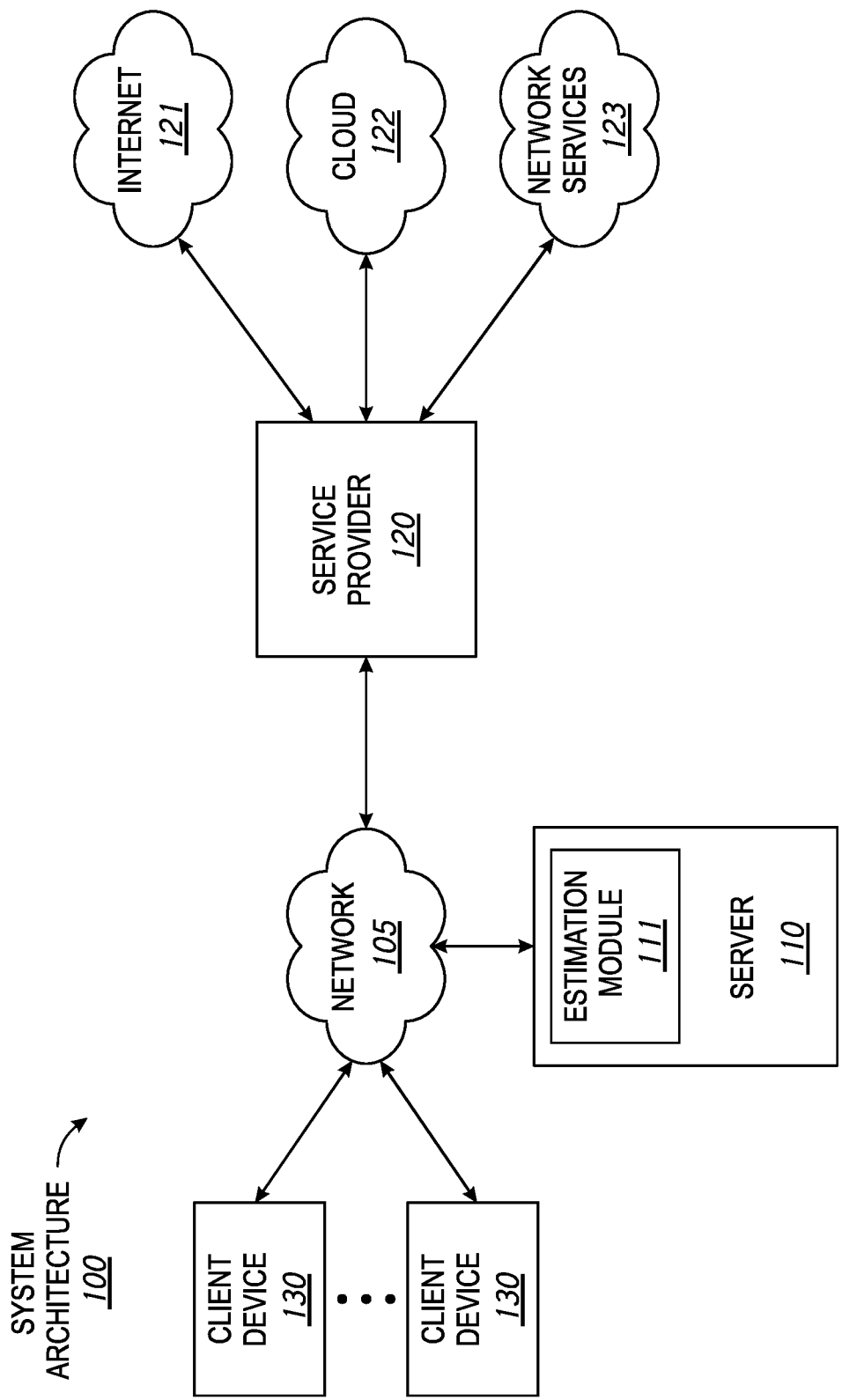
FIG. 1 is a block diagram illustrating a system architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for determining an estimated network utilization. For example, in some implementations, a method includes obtaining time series data. The time series data includes a plurality of network utilization measurements. The plurality of network utilization measurements is indicative of a plurality of utilizations of one or more resources of a network resource at a plurality of times. The method also includes determining whether the time series data comprises a plurality of segments. Each segment of the plurality of segments is associated with a separate regression model and each segment includes a portion of the time series data. The method further includes identifying a current segment from the time series data when the time series data comprises the plurality of segments. The method further includes determining an estimated network utilization based on a current regression model associated with the current segment.

DETAILED DESCRIPTION

Service providers may charge a fee to allow the client devices (e.g., computing devices such as desktop computers, laptop computers, server computers, etc.) to access and/or use one or more resources, networks, and/or services of the service provider. For example, the service provider may charge a fee for each unit of data (e.g., megabyte, gigabyte, etc.) that is accessed by a client device. The service providers may charge additional fees (at a higher rate) if the network utilization (e.g., usage of a resource, network, and/or service) exceeds the amount of network utilization that was paid for. In addition, if the actual network utilization is less than amount of network utilization that was paid for, services providers may not refund the fees for different between the actual network utilization and the amount of network utilization that was paid for.

In some embodiments, a server and/or an estimation module may use a composite regression model to determine an estimated network utilization. The composite regression model may include a first regression model and a second regression model. The first regression model may be a linear regression model. The second regression model may be a regression model that may take into account seasonality in time series data (as discussed below). The server and/or estimation module may also identify segments in the time series data. Each segment in the time series data may be associated with a different composite regression model. The server and/or estimation module may use the composite regression model associated with the current segment (e.g., the latest segment) to more accurately determine an estimated network utilization.

FIG. 1 is a block diagram illustrating a system architecture 100, in accordance with some embodiments. The system architecture includes a server 110, client devices 130, a network 105, and a service provider 120. As discussed above, the service provider 120 may own, operate, manage, and/or maintain various resources and/or services that may be accessed/used by the client devices 130 via the network 105.

The server 110 may be one or more computing devices (such as a rack-mount server, a router computer, a server computer, a personal computer, a mainframe computer, a smartphone, a personal digital assistant (PDA), a laptop computer, a tablet computer, a desktop computer, etc.). Each of the client devices 130 may also be a computing device (e.g., a personal computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The service provider 120 may be an entity that manages, owns, and/or provides access to resources, networks and/or services. The service provider 120 may allow the client devices 130 to access and/or use one or more resources, networks, and/or services of the service provider 120. In one embodiment, the service provider 120 may provide client devices 130 with network access to a publicly or globally accessible network, such as the internet 121. For example, the service provider 120 may provide a number of client devices 130 with access to the internet 121. In another example, the service provider 120 may allow an amount of data to be communicated (e.g., transmitted and/or received) between the client devices 130 and the internet 121 in a period of time (e.g., in a day, in a week, etc.).

In another embodiment, the service provider 120 may provide client devices 130 with access to the cloud 122 and/or may allow the client devices 130 to use resources of the cloud 122. The cloud 122 may be a collection of resources that are operated by service provider 120. For example, the cloud 122 may include one or more of infrastructure resources (e.g., server computers, data storage, etc.), computing resources (e.g., mainframe computers, server computers, etc.), network resources (e.g., routers, switches, etc.), and software resources (e.g., applications, services, web services, etc.). The different resources of the cloud 122 may be combined to form cloud resources. For example, a cloud resource may be a web service (e.g., a software resource) that is operating (e.g., executing) on one or more computing devices (e.g., infrastructure resources) of the cloud 122. In another example, a cloud resource may one or more virtual machines (e.g., virtualized computing devices) that use computing resources (e.g., server computers, processing power, etc.) of the cloud 122.

In a further embodiment, the service provider 120 may provide client devices 130 access to network services 123. For example, the service provider 120 may provide client devices 130 with access to digital videos, digital music, digital images, etc. In another example, the service provider 120 may provide client devices 130 with video-conferencing services.

As discussed above, the service provider 120 may allow the client devices 130 to access the internet and/or use of one or more of the cloud 122 or network services 123. In one embodiment, the amount of resources, bandwidth, and/or services used and/or accessed by the client devices 130 may be referred to as network utilization. For example, the bandwidth consumption or amount of data (e.g., measured in megabytes, gigabytes, terabytes, etc.) communicated between the client devices 130 and the internet 121 may be referred to as network utilization. In another example, the amount of resources of the cloud 122 (e.g., computing resources) used by the client devices 130 may be referred to as network utilization. The amount of network utilization may be tracked and/or measured over time at different time intervals. For example, the amount of bandwidth consumed by the client devices 130 (e.g., the amount of data transmitted/received between the client devices 130 and the internet 121) may be tracked/measured on an hourly basis, a daily basis, a weekly basis, a monthly basis, etc. In another example, the amount of computing resources of the cloud 122 may be tracked/measured on an hourly basis, a daily basis, a weekly basis, a monthly basis, etc. The different time intervals may also be referred to as granularities. The amount of network utilization measured/tracked at each time interval (or granularity) may be referred to as a network utilization measurement. For example, the client devices 130 may communicate (e.g., transmit/receive) ten gigabytes of data with the internet 121 on Jan. 1, 2014. This may referred to as a network utilization measurement.

In one embodiment, the server 110 and/or the estimation module 111 may successively measure/track the amount of network utilization at each time interval to generate time series data. The time series data may include a plurality of network utilization measurements over a period of time. For example, the time series data may include successive (e.g., hourly, daily, weekly, etc.) network utilization measurements over a period of days, weeks, months, years, etc. In another embodiment, the server 110 and/or estimation module 111 may obtain the time series data from the service provider 120. For example, the server 110 and/or estimation module 111 may transmit a request for the time series data to the service provider 120 and the service provider 120 may provide the time series data to the server 110 and/or estimation module 111. In one embodiment, the estimation module 111 may adjust (e.g., change or modify) the granularity (e.g., the time interval) of the network utilization measurements in the time series data. For example, seven daily network utilization measurements may be added together to determine a weekly utilization measurement (e.g., a daily granularity may be adjusted to a weekly granularity). In another example, twenty-four hourly network utilization measurements may be added together to determine a daily network utilization measurement (e.g., an hourly granularity may be adjusted to a daily granularity).

In one embodiment, the service provider 120 may charge for access to and/or use of the resources, networks, and/or services of the service provider 120. For example, the service provider 120 may charge an amount of money to provide the client devices 130 with an amount of consumption bandwidth for a time interval (e.g., the service provider 120 may charge $1000 to allow ten gigabytes of data to be communicated between the client devices 130 and the internet 121). In another example, the service provider 120 may charge an amount of money to provide the client devices 130 with access to or use of an amount of resources in the cloud 122 (e.g., the service provider 120 may charge $2000 to use twenty server computers of the cloud 122 for one day).

In one embodiment, the service provider 120 may allow the client devices 130 to access and/or use more of the resources, networks, and/or services than the client devices 130 have paid for. For example, the client devices 130 may pay $1000 for ten gigabytes of data bandwidth per day (e.g., $1000 to communicate ten gigabytes of data between the client devices 130 and the internet 121). However, the service provider 120 may allow the client devices 130 to exceed the data bandwidth that has been paid for (e.g., may allow the client devices 130 to communicate more than ten gigabytes of data per day). The service provider 120 may charge a more expensive cost/rate for the amount of data bandwidth that exceeds ten gigabytes a day. In another embodiment, although the client devices 130 may pay for an amount of data bandwidth per day. However, the client devices 130 may use less than the amount of data bandwidth that was paid for. For example, the client devices 130 may pay for a data bandwidth of twenty gigabytes per day but may only use twelve gigabytes of data per day. The service provider 120 may still charge the client devices 130 for the data bandwidth of twenty gigabytes per day even though the client devices 130 may use only twelve gigabytes of data per day. Thus, it may be useful to more accurately estimate the amount of network utilization of the client devices 130 (e.g., the amount of resources, networks, and/or services that may be used and/or accessed by the client devices 130). A more accurate estimate of the network utilization of the client devices 130 may allow a user (e.g., a network administrator) to reduce the costs for access to and/or use of the resources, networks, and/or services.

In one embodiment, a linear regression model may be used to estimate the amount of network utilization of the client devices 130. A linear regression model may be defined with the following equation:

$$y = x\beta + u \quad (1)$$

where y represents the dependent variables in the linear regression model, where x represents the independent variables (e.g., input variables) in the linear regression model, where $\beta$ represents the regression coefficients, and where u represents error terms or noise.

The linear regression model illustrated in equation (1) may be useful in determining an estimated network utilization. For example, the linear regression model may be used to determine an estimated network utilization by applying the regression model to previous network utilization measurements. In one embodiment, the linear regression model may capture a trend for the network utilization. The trend may indicate a movement in time series data (as discussed in more detail below). For example, the trend may indicate whether network utilization measurements have increased or decreased over a period of time. The trend may also indicate a rate of the increase and/or decrease. Although the linear regression model illustrated in equation (1) may be useful for determining an estimated network utilization (e.g., for estimating network utilization), the linear regression model may not be able to identify changes in trends of the time series data. For example, a company may add a new office location which may increase the number of users and/or client devices 130 in the system architecture 100. The additional users may shift or change the trend in the network utilization measurements. In another example, software on the client devices 130 may be updated. This may cause the client devices 130 to communicate (e.g., transmit/receive) more data with the internet 121 (e.g., to download the software updates). In addition, the linear regression model illustrated in equation (1) may not be to take into account seasonality. Seasonality may refer to a cyclic variation in the time series data that may occur regularly or semi-regularly. For example, the bandwidth consumption of the client devices 130 may decrease on the weekends because most users of the client devices 130 are not at work on the weekends. This weekly decrease (e.g., cyclic variation) in the bandwidth consumption may be referred to as seasonality. Seasonality may also be referred to as seasonal variation, periodic variation, and/or periodic fluctuations. Because the time series data (e.g., plurality of network utilization measurements) may include shifts/changes in trend and/or seasonality, the linear regression model illustrated in equation (1) may not be able to accurately estimate the amount of network utilization of the client devices.

In one embodiment, the estimation module 111 (and/or server 110) may determine an estimated network utilization based on time series data that includes a plurality of network utilization measurements (e.g., a plurality of bandwidth consumption measurements performed or recorded over a period of time). The estimation module 111 may obtain the time series data (e.g., may obtain the plurality of network utilization measurements) by monitoring the client devices 130 and/or network 105. The estimation module 111 may also obtain the time series data by querying the service provider 120 for the time series data. Each of the network utilization measurements may indicate a utilization or an amount of utilization of a resource at a particular time. The estimation module 111 may also adjust (e.g., change or modify) the granularity of the time series data (as discussed above).

In one embodiment, the estimation module 111 may use a composite regression model to determine an estimated network utilization based on time series data (e.g., a plurality of network utilization measurements). The composite regression model may include the linear regression model illustrated in equation (1). As discussed above, the linear regression model may be useful for determining a trend for time series data and/or a portion/subset of the time series data. In one embodiment, the combined regression model may also include a second regression model that may take into account the seasonality of the time series data. For example, the combined regression model may also include an autoregressive integrated moving average (ARIMA) model, a Holt-Winters model (also referred to as the ETS model), and/or a seasonal decomposition of time series by Loess (STL) model. An example composite regression model is illustrated below in equations (10) and (11).

In one embodiment, the estimation module 111 may analyze the time series data to determine whether the time series data includes a plurality of segments. Each segment may include a portion of the time series data (e.g., may include a subset of the plurality of network utilization measurements). In one embodiment, the segments may not overlap. Each segment may also be associated with a separate and/or different composite regression model. For example, a first segment may be associated with a first composite regression model, a second segment may be associated with a second composite regression model, etc. In one embodiment, each composite regression model may indicate the trend for an associated segment of the time series data. For example, the trend of a segment of the time series data may be determined or identified using the composite regression model associated with the segment (as discussed in more detail below). In another embodiment, each composite regression model may also indicate deviations from the trend for an associated segment of the time series data. The estimation module 111 may use various algorithms, functions, and/or operations to determine whether the time series data includes a plurality of segments and/or to identify the plurality of segments. For example, the estimation module 111 may use hidden Markov models, a sliding window algorithm, a top-down algorithm, a bottom-up algorithm, etc. In other examples, minimizing the residual sum of linear regression models or a cross-entropy method (e.g., a model based stochastic optimization technique to estimate both the number locations of breakpoints between segments) may be used to identify the plurality of segments. In another embodiment, the segments in the time series data may be identified by a user (e.g., a network administrator). For example, a user may provide input identifying the different segments in the time series data (e.g., identifying the boundaries of the segments).

In one embodiment, the estimation module 111 may identify a current segment (e.g., the last or latest segment) in the time series data when the estimation module 111 determines that the time series data includes a plurality of segments (as discussed in more detail below). As discussed above, each segment in the time series data is associated with a composite regression model and the current segment is associated with a current composite regression model. The estimation module 111 may determine an estimated network utilization (e.g., an estimated bandwidth consumption, an estimated amount of cloud resources that may be used, etc.) based on the current regression model. The estimation module 111 may also refrain from using previous segments and/or previous composite regression models associated with the previous segments. For example, the network utilization measures in the previous segments may not be used to determine the estimated network utilization.

In one embodiment, the estimation module 111 may determine an estimated network utilization based on an initial regression model when the estimation module 111 determines that the time series data does not include a plurality of segments (as discussed in more detail below). For example, the estimation module 111 may determine an initial regression model based on the time series data and may use the initial regression model to determine the estimated network utilization.

In one embodiment, the estimation module 111 may allow the server 110 to more accurately determine an estimated network utilization (e.g., an estimated bandwidth consumption, an estimated amount of resource usage of the cloud 122, etc.). For example, the composite regression model used by the estimation module 111 may allow the server 110 to more accurately determine an estimated network utilization as compared to solely using a linear regression model, solely using an ARIMA model, solely using a Holt-Winters model, or solely using an STL model.

This may allow a network administrator to reduce the costs incurred for access to and/or use of the resources, networks, and/or services of the service provider 120. For example, a more accurate estimated network utilization may reduce the amount of excess network utilization (e.g., the amount of network utilization that exceeds was paid for). This may reduce the costs incurred due to the excess network utilization. In another example, a more accurate estimated network utilization may reduce the amount of wasted network utilization (e.g., the amount of network utilization that was paid for but not used). This may allow the network administrator to pay for a lower amount of network utilization and reduce costs.

Although FIG. 1 may refer to the access to the internet 121, access/use of the cloud 122, and/or access/use network services 123, the resources and/or services described here are merely examples. Other embodiments may determine estimated utilizations and/or usages of other types of resources and/or services. For example, the embodiments, implementations, and/or examples described herein may be applicable to any type of resources, service, and/or network that may be accessed and/or used by the client devices 130.

Figure 2:
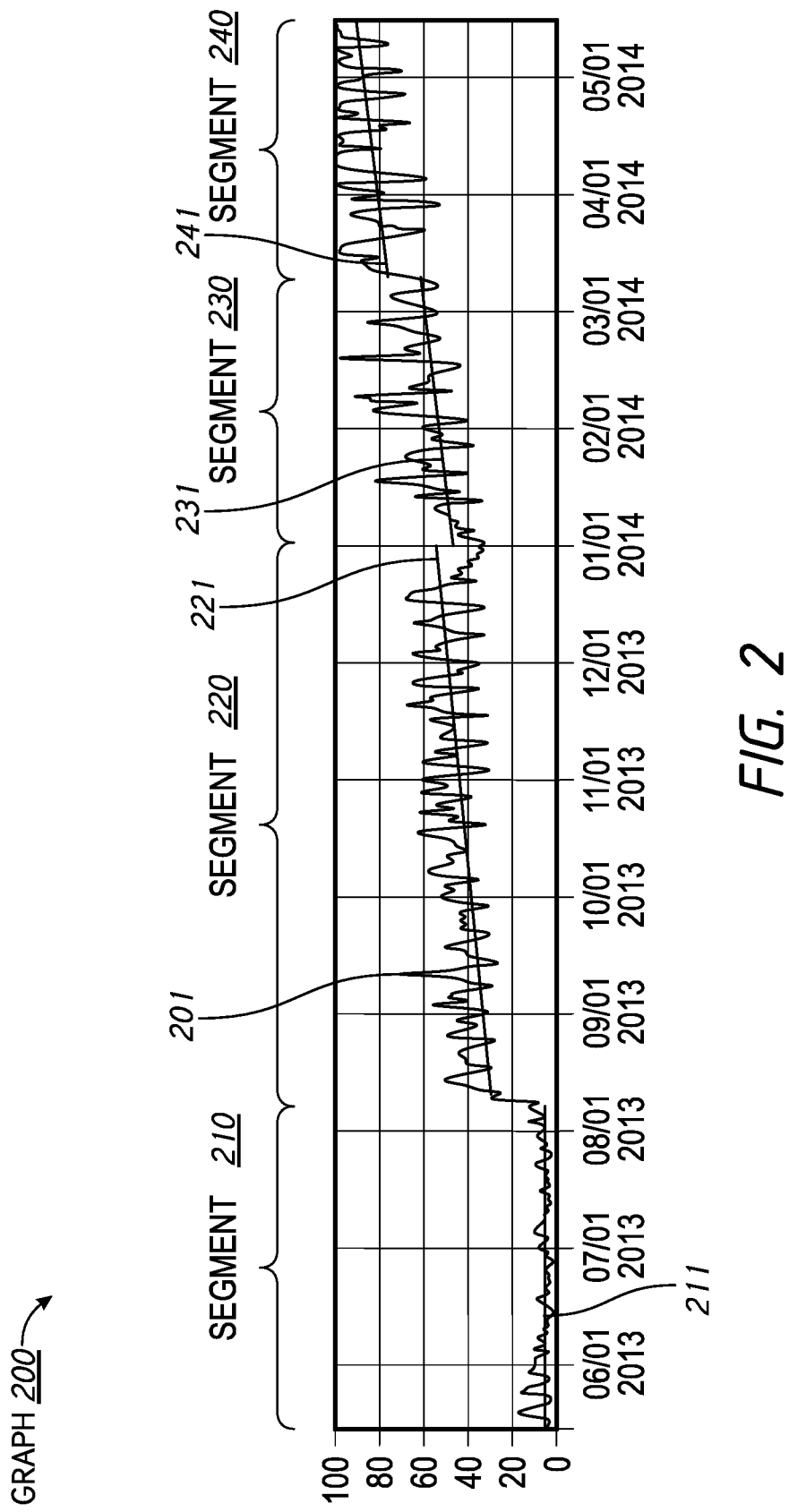
FIG. 2 is a graph illustrating example network utilization measurements, in accordance with some embodiments.

FIG. 2 is a graph 200 illustrating example network utilization measurements, in accordance with some embodiments. The y-axis of the graph 200 may indicate an amount of bandwidth consumption by one or more client devices in gigabytes (GBs). For example, referring to FIG. 1, the y-axis of the graph 200 may indicate the amount of data communicated (e.g., transmitted/received) between the client devices 130 and the internet 121. The x-axis of the graph 200 may indicate different times starting at approximately Jun. 1, 2013 and ending after May 1, 2014. The graph 200 includes line 201. The line 201 may indicate the amount of bandwidth consumption measured on a daily basis. For example, the line 201 may indicate a plurality of network utilization measurements (e.g., bandwidth consumption measurements) taken on a daily basis. In one embodiment, the line 201 may represent time series data that includes the plurality of network utilization measurements (e.g., bandwidth consumption measurements).

As illustrated in FIG. 2, the time series data represented by the line 201 includes multiple segments, segment 210, segment 220, segment 230, and segment 240. Each segment includes a portion of the time series data represented by the line 201. For example, segment 210 includes the portion of the time series data starting before Jun. 1, 2013 to approximately Aug. 7, 2013, segment 220 includes the portion of the time series data starting from approximately Aug. 7, 2013 to Jan. 1, 2014, etc. Each segment is associated with a trend. For example, segment 210 is associated with a trend 211, segment 220 is associated with a trend 221, segment 230 is associated with a trend 231, and segment 240 is associated with a trend 241. As discussed above, a trend may indicate a movement in the segment (e.g., may indicate a movement in the time series data). For example, trend 211 may indicate that the bandwidth consumption between Jun. 1, 2013 and approximately Aug. 7, 2013 is generally not increasing or decreasing (e.g., the bandwidth consumption is relatively flat or stable). In another example, trend 221 may indicate that the bandwidth consumption between approximately Aug. 9, 2013 and Jan. 1, 2014 is generally increasing (e.g., the trend 221 goes upwards).

As discussed above, although the linear regression model illustrated in equation (1) may be useful for determining a trend for time series data, the linear regression model may not be able to identify changes in trends in time series data. For example, the linear regression model may not be used to determine that trend 221 (for segment 220) is different from the trend 211 (for segment 210). If both of the segments 210 and 220 are used to determine estimated network utilizations (e.g., estimated bandwidth consumption) for a time (e.g., date) within segment 220, the estimated network utilizations may be too low because the network utilization measurements of segments 210 may skew the estimated network utilizations (e.g., may cause the estimated network utilizations to be lower). In another example, the linear regression model may not be used to determine that trend 231 (for segment 230) is different from the trend 221 (for segment 220). If both of the segments 220 and 230 are used to determine estimated network utilizations (e.g., estimated bandwidth consumption) for a time (e.g., date) within segment 230, the estimated network utilizations may be too high because the network utilization measurements of segments 220 may skew the estimated network utilizations (e.g., may cause the estimated network utilizations to be higher). Also as discussed above, the linear regression model illustrated in equation (1) may not be able to take into account seasonality (e.g., cyclic variations in the time series data).

Figure 3A:
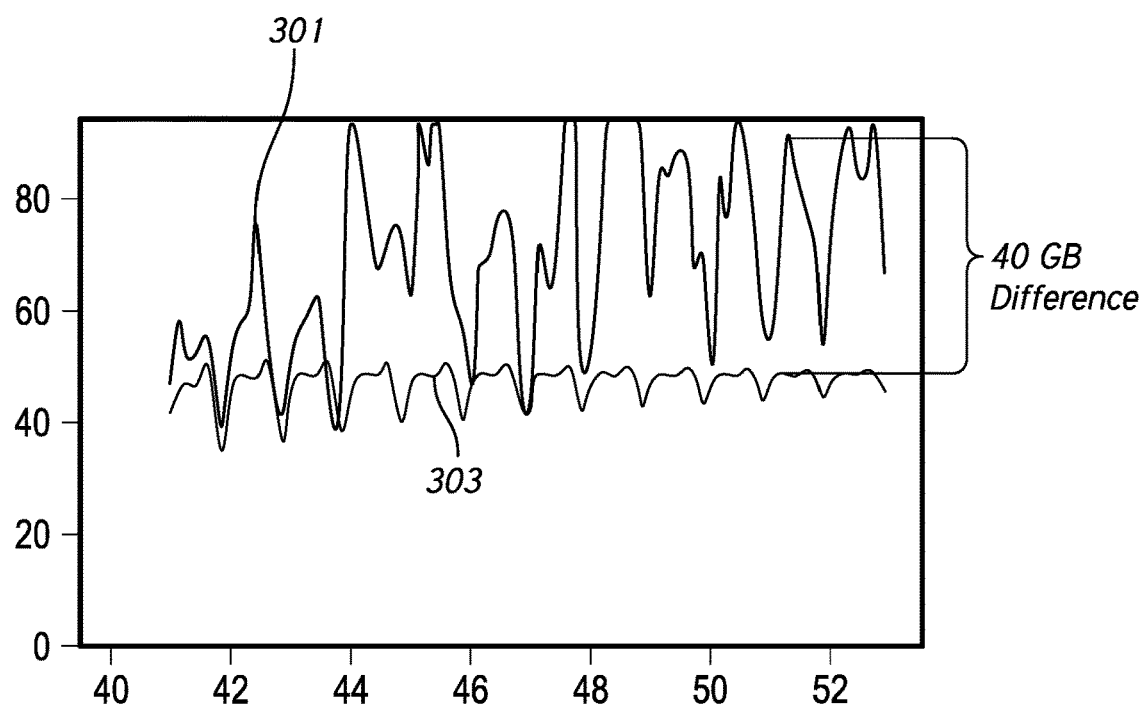
FIG. 3A is a graph illustrating example network utilization measurements, in accordance with some embodiments.

FIG. 3A is a graph 300 illustrating example network utilization measurements, in accordance with some embodiments. The y-axis of the graph 300 may indicate an amount of bandwidth consumption by one or more client devices in gigabytes (GBs). The x-axis of the graph may indicate different times starting at approximately the fortieth week through the fifty second week of a calendar year (e.g., week 40 through week 52). The graph 300 includes solid line 301 and dashed line 303. The solid line 301 may indicate the amount of bandwidth consumption measured on a daily basis. For example, the solid line 301 may indicate a plurality of network utilization measurements (e.g., bandwidth consumption measurements) taken on a daily basis. In one embodiment, the solid line 301 may represent time series data that includes the plurality of network utilization measurements (e.g., bandwidth consumption measurements).

The graph 300 also includes dashed line 303. Dashed line 303 may indicate estimated network utilizations determined on a daily basis. The estimated network utilizations indicated by the dashed line 303 may be generated using an ARIMA model. A non-seasonal ARIMA model may be defined with the following equation:

$$ARIMA(p,d,q) \quad (2)$$

where p is the number of autoregressive terms, where d is the number of non-seasonal differences for stationarity, where q is the number of lagged forecast errors. A seasonal ARIMA model may also be defined with the following equation:

$$ARIMA(p,d,q)(P,D,Q)_m \quad (3)$$

where p is the number of autoregressive terms, where d is the number of non-seasonal differences for stationarity, where q is the number of lagged forecast errors, where P is the number of seasonal autoregressive (SAR) terms, where D is the number of seasonal differences, where Q is the number of seasonal moving average (SMA) terms, and where m is the number of seasons.

As illustrated in FIG. 3A, the estimated network utilizations (illustrated by dashed line 303) determined using only an ARIMA model are not accurate estimates of the actual network utilizations (illustrated by solid line 301). For example, at around week 51, the actual network utilization (e.g., 90 GBs) is approximately 40 GBs greater than the estimated network utilization (e.g., 50 GBs).

Figure 3B:
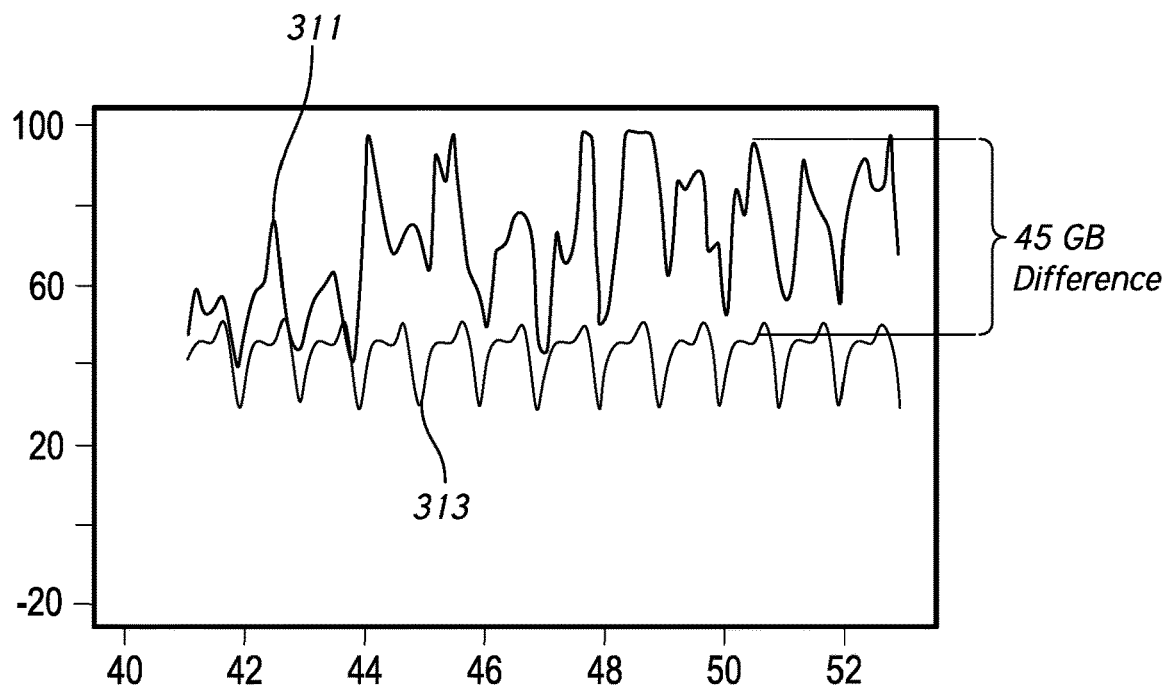
FIG. 3B is a graph illustrating example network utilization measurements, in accordance with some embodiments.

FIG. 3B is a graph 310 illustrating example network utilization measurements, in accordance with some embodiments. The y-axis of the graph 310 may indicate an amount of bandwidth consumption by one or more client devices in gigabytes (GBs). The x-axis of the graph may indicate different times starting at approximately the fortieth week through the fifty second week of a calendar year (e.g., week 40 through week 52). The solid line 311 may indicate the amount of bandwidth consumption measured on a daily basis. In one embodiment, the solid line 311 may represent time series data that includes the plurality of network utilization measurements (e.g., bandwidth consumption measurements). The dashed line 313 may indicate estimated network utilizations determined on a daily basis. The estimated network utilizations indicated by the dashed line 313 may be generated using the Holt-Winters model (also known as the ETS model). An additive Holt-Winters model may be defined with the following equations:

$$a_t = \alpha(Y_t - s_{t-p}) + (1-\alpha)(a_{t-1} + b_{t-1}) \quad (4)$$

$$b_t = \beta(a_t - a_{t-1}) + (1-\beta)b_{t-1} \quad (5)$$

$$s_t = \gamma(Y_t - a_y) + (1-\gamma)s_{t-p} \quad (6)$$

where $\alpha$, $\beta$, and $\gamma$ are the smoothing parameters, where $a_t$ is the smoothed level at time t, where $b_t$ is the change in the trend at time t, where $s_t$ is the seasonal smooth at time t, and where p is the number of seasons per year. A multiplicative Holt-Winters model may be defined with the following equations:

$$a_t = \alpha \frac{Y_t}{s_{t-p}} + (1-\alpha)(a_{t-1} + b_{t-1}) \quad (7)$$

$$b_t = \beta(a_t - a_{t-1}) + (1-\beta)b_{t-1} \quad (8)$$

$$s_t = \gamma \frac{Y_t}{a_t} + (1-\gamma)s_{t-p} \quad (9)$$

where $\alpha$, $\beta$, and $\gamma$ are the smoothing parameters, where $a_t$ is the smoothed level at time t, where $b_t$ is the change in the trend at time t, where $s_t$ is the seasonal smooth at time t, and where p is the number of seasons per year.

As illustrated in FIG. 3B, the estimated network utilizations (illustrated by dashed line 313) determined using only a Holt-Winters model (e.g., either the additive Holt-Winters model or the multiplicative Holt-Winters model) are not accurate estimates of the actual network utilizations (illustrated by solid line 311). For example, at approximately week 51, the actual network utilization (e.g., 90 GBs) is approximately 45 GBs greater than the estimated network utilization (e.g., 45 GBs).

Figure 3C:
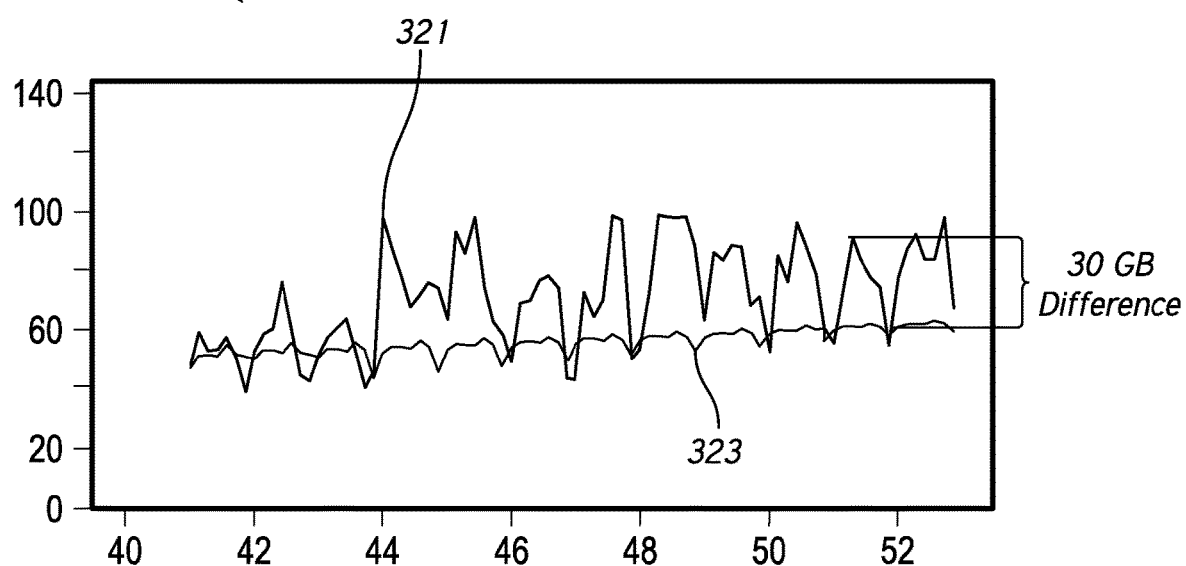
FIG. 3C is a graph illustrating example network utilization measurements, in accordance with some embodiments.

FIG. 3C is a graph 320 illustrating example network utilization measurements, in accordance with some embodiments. The y-axis of the graph 320 may indicate an amount of bandwidth consumption by one or more client devices in gigabytes (GBs). The x-axis of the graph may indicate different times starting at approximately the fortieth week through the fifty second week of a calendar year (e.g., week 40 through week 52). The solid line 321 may indicate the amount of bandwidth consumption measured on a daily basis. In one embodiment, the solid line 321 may represent time series data that includes the plurality of network utilization measurements (e.g., bandwidth consumption measurements). The dashed line 323 may indicate estimated network utilizations determined on a daily basis. The estimated network utilizations indicated by the dashed line 323 may be generated using a composite regression model without segmentation of the time series data (e.g. without dividing the time series data into segments and using a different composite regression model for each segment). As discussed above, a composite regression model may include the linear regression module illustrated in equation (1) and a second regression model. In one embodiment, the second regression model may be an ARIMA model. An example composite regression model is illustrated in the following equations:

$$y = x_i^T + u_i + e_i \quad (10)$$

$$e_t \sim ARIMA(p,d,q) \text{ or } ARIMA(p,d,q)(P,D,Q)_m \quad (11)$$

In other embodiments, the term $e_i$ may be determined using other types of regression models. For example (as discussed above), the Holt-Winters model (illustrated in equations (4)-(9)) may be used to determine the term $e_i$. In another example, the STL model may be used to determine the term $e_i$.

As illustrated in FIG. 3C, the estimated network utilizations (illustrated by dashed line 313) determined using the composite regression model without segmenting the time series data are not accurate estimates of the actual network utilizations (illustrated by solid line 311). For example, at approximately week 51, the actual network utilization (e.g., 90 GBs) is approximately 30 GBs greater than the estimated network utilization (e.g., 60 GBs).

Figure 3D:
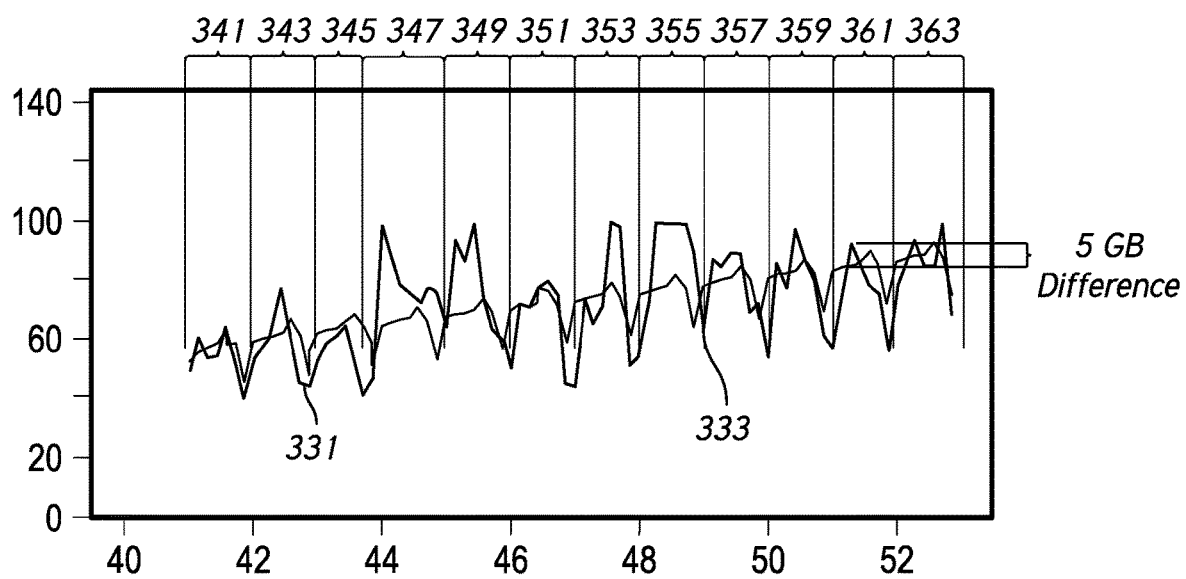
FIG. 3D is a graph illustrating example network utilization measurements, in accordance with some embodiments.

FIG. 3D is a graph 330 illustrating example network utilization measurements, in accordance with some embodiments. The y-axis of the graph 330 may indicate an amount of bandwidth consumption by one or more client devices in gigabytes (GBs). The x-axis of the graph may indicate different times starting at approximately the fortieth week through the fifty second week of a calendar year (e.g., week 40 through week 52). The solid line 331 may indicate the amount of bandwidth consumption measured on a daily basis. In one embodiment, the solid line 331 may represent time series data that includes the plurality of network utilization measurements (e.g., bandwidth consumption measurements). The dashed line 333 may indicate estimated network utilizations determined on a daily basis. The estimated network utilizations indicated by the dashed line 333 may be generated using a composite regression model without segmentation of the time series data (e.g. without dividing the time series data into segments and using a different composite regression model for each segment). As discussed above, a composite regression model may include the linear regression module illustrated in equation (1) and a second regression model, such as an ARIMA model.

As illustrated in FIG. 3D, the network utilization measurements (e.g., the time series data) are divided into segments 341, 343, 345, 347, 349, 351, 353, 355, 357, 359, 361, and 363. Each segment may be associated with a different composite regression model and each segment may have a different trend (as discussed above). For example, segment 341 may be associated with a first composite regression model that may be used to determine estimated network utilization measurements for the time frame encompassed by segment 341 (e.g., approximately week 41 to week 42). In another example, segment 343 may be associated with a second composite regression model that may be used to determine estimated network utilization measurements for the time frame encompassed by segment 343 (e.g., approximately week 42 to week 43).

As discussed above, when the time series data includes multiple segments, the composite regression model associated with the current segment (e.g., the latest or last segment) may be used to determine estimated network utilization measurements. Referring to FIG. 3D, the composite regression model associated with segment 363 may be used to determine estimated network utilization measurements. The segments network utilization measurements in segments 341, 343, 345, 347, 349, 351, 353, 355, 357, 359, and 361 may not be used to determine the estimated network utilization measurements. In addition, the composite regression models associated with the segments 341, 343, 345, 347, 349, 351, 353, 355, 357, 359, and 361 may not be used to determine the estimated network utilization measurements.

As illustrated in FIG. 3D, the estimated network utilizations (illustrated by dashed line 333) determined using segmentation and a composite regression model are more accurate than the estimated network utilizations illustrated in FIGS. 3A through 3C. For example, at approximately week 51, the actual network utilization (e.g., 90 GBs) is 10 GBs greater than the estimated network utilization (e.g., 80 GBs), as compared to a 40 GB difference in FIG. 3A, a 45 GB difference in FIG. 3B, and a 30 GB difference in FIG. 3C.

Figure 4:
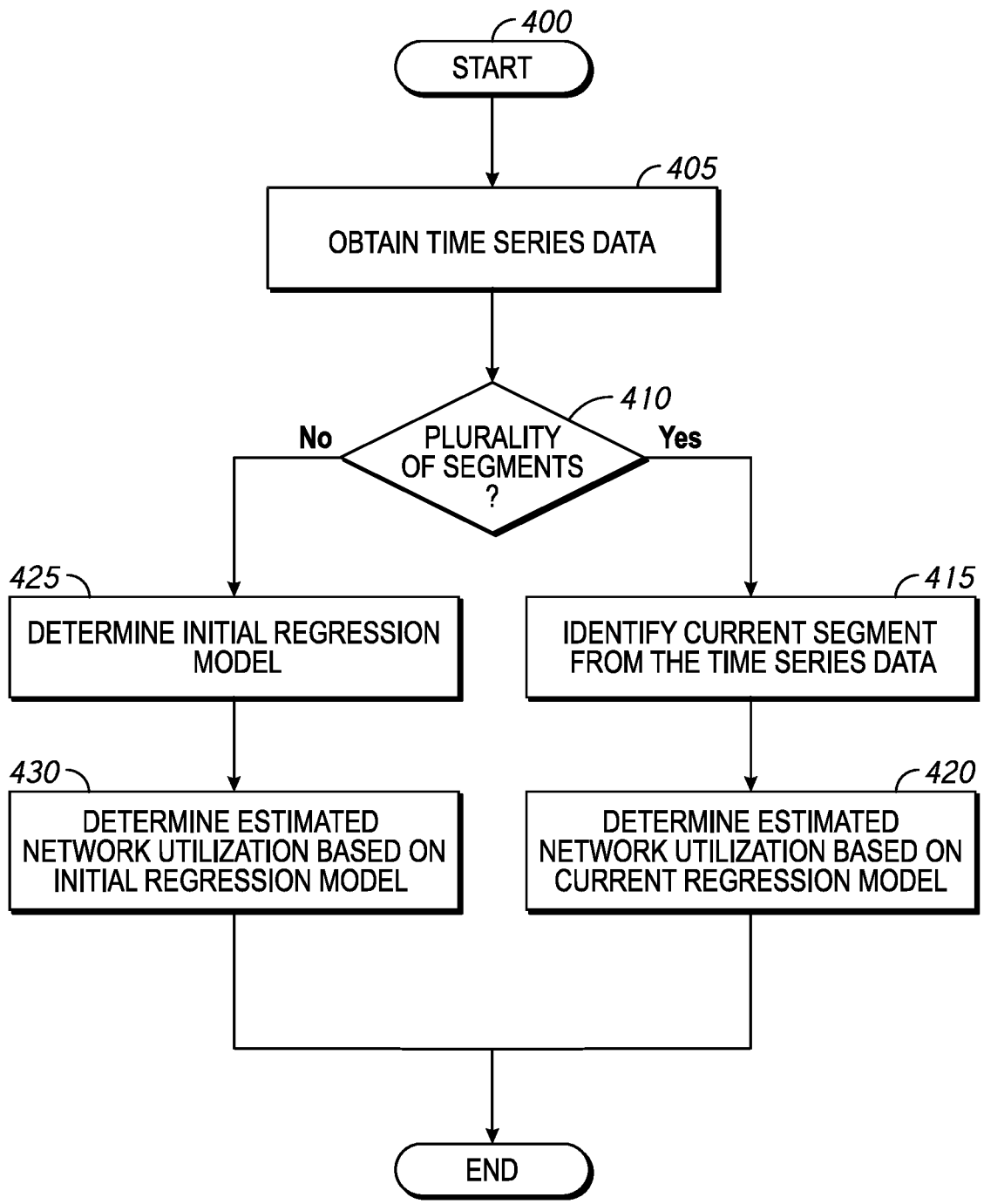
FIG. 4 is a flowchart representation of a method of determining an estimated network utilization, in accordance with some embodiments.

FIG. 4 is a flowchart representation of a method 400 of determining an estimated network utilization, in accordance with some embodiments. In some implementations, the method 400 may be performed by a server and/or an estimation module (e.g., server 110 and/or estimation module 111 illustrated in FIG. 1). The server and/or estimation module may include hardware (e.g., circuitry, dedicated logic, programmable logic, microcode, etc.), software (e.g., instructions run on a processor to perform hardware simulation), firmware, or a combination thereof. Briefly, method 400 includes determining whether time series data includes multiple segments and determining an estimated network utilization based on a current regression model associated with a current segment. The method 400 begins at block 405 where the method 400 includes obtaining time series data. For example, referring to FIG. 1, the estimation module 111 may measure network utilization and store the network utilization measurements (e.g., bandwidth consumption measurements). In another example, the estimation module 111 may request network utilization measurements from the service provider 120. The method 400 may also optionally adjust (e.g., change or modify) the granularity of the time series data, as discussed above. At block 410, the method 400 includes determining whether the time series data includes a plurality of segments. If the time series data does not include a plurality of segments, the method 400 includes determining an initial regression model (e.g., an initial composite regression model) at block 425. For example, the method 400 may identify or determine an initial regression model that may best fit the time series data. At block 430, the method 400 may determine an estimated network utilization based on the initial regression model.

If the time series data does include a plurality of segments, the method 400 includes identifying a current segment from the time series data. For example, the method 400 may identify the latest or last segment in the time series data. As discussed above, each segment in the time series data may be associated with a different regression model (e.g., a different composite regression model). The current segment may be associate with a regression model (e.g., a current regression model). At block 430, the method 420 may include determining an estimated network utilization based on the current regression model. As discussed above, the method 400 may refrain from using previous segments and/or previous composite regression models associated with the previous segments. For example, the portions of the times series data in the previous segments (e.g., segments prior to the current segment) may not be used to determine the estimated network utilization.

Figure 5:
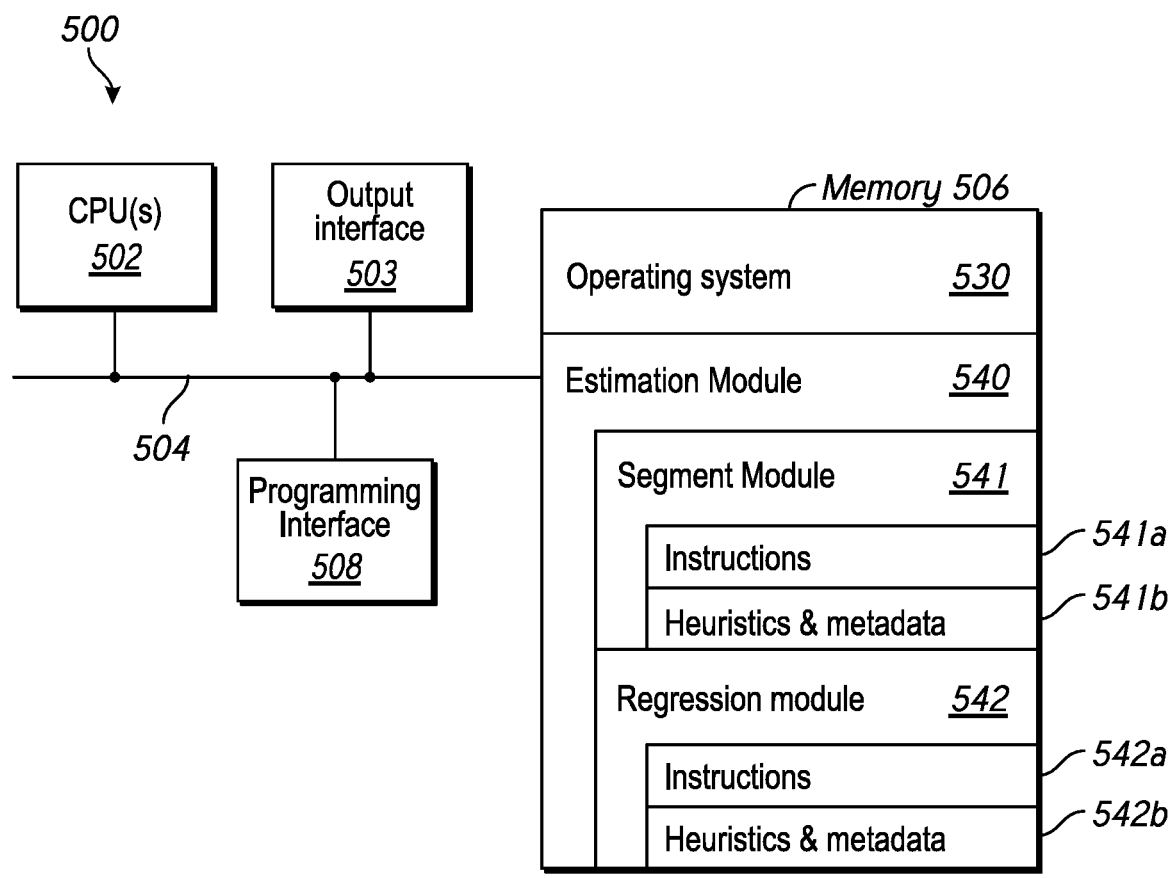
FIG. 5 is a block diagram of a computing device, in accordance with some embodiments.

FIG. 5 is a block diagram of a computing device 500, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 500 includes one or more processing units (CPU's) 502 (e.g., processors), one or more output interfaces 503, a memory 506, a programming interface 508, and one or more communication buses 504 for interconnecting these and various other components.

In some embodiments, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some embodiments, the memory 506 or the non-transitory computer readable storage medium of the memory 506 stores the following programs, modules and data structures, or a subset thereof including an optional operating system 530 and a server module 540. In some embodiment, one or more instructions are included in a combination of logic and non-transitory memory. The operating system 530 includes procedures for handling various basic system services and for performing hardware dependent tasks. In some embodiments, the estimation module 540 may be configured to obtain time series data, determine whether the time series data includes a plurality of segments, identify a current segment, and determine an estimated network utilization. To that end, the estimation module 540 includes segment module 541 and regression module 542.

In some embodiments, the segment module 541 may obtain time series data and determine whether the time series data includes a plurality of segments. To that end, the segment module 541 includes a set of instructions 541a and heuristics and metadata 541b. In some embodiments, the regression module 542 may determine an estimated network utilization based on an initial regression model or a current regression model. To that end, the regression module 542 includes a set of instructions 542a and heuristics and metadata 542b.

Although the estimation module 540, the segment module 541, and the regression module 542 are illustrated as residing on a single computing device 500, it should be understood that in other embodiments, any combination of the estimation module 540, the segment module 541, and the regression module 542 may reside on separate computing devices.

Moreover, FIG. 5 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) (e.g., application specific circuitry such as ASICs or FPGAs) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method comprising:
   obtaining time series data comprising a plurality of network utilization measurements;
   determining whether the time series data are divisible into a plurality of non-overlapping segments; and
   in response to determining that the time series data is divisible into the plurality of non-overlapping segments:
      identifying a current segment among the plurality of non-overlapping segments from the time series data; and
      determining an estimated network utilization based on a current regression model associated with the current segment to reduce an overuse or underuse of network utilization;
   in response to determining that the time series data cannot be divided into the plurality of non-overlapping segments:
      determining an initial regression model for the time series data; and
      determining the estimated network utilization based on the initial regression model.

2. The method of claim 1, wherein the current regression model comprises a linear regression model.

3. The method of claim 1, wherein the current regression model is an autoregressive integrated moving average (ARIMA) model; a Holt-Winters model; or a Seasonal and Trend Decomposition Using Loess (STL) model.

4. The method of claim 1, wherein the current regression model is a Holt-Winters model.

5. The method of claim 1, wherein the current regression model is a Seasonal and Trend Decomposition Using Loess (STL) model.

6. The method of claim 1, wherein the current regression model indicates a trend of the current segment and indicates deviations from the trend of the current segment.

7. The method of claim 1, wherein each segment of the plurality of non-overlapping segments is associated with a different trend.

8. A non-transitory computer readable storage medium comprising instructions which, when executed by one or more processors, causes the one or more processors to:
   obtain time series data comprising a plurality of network utilization measurements;

determine whether the time series data are divisible into a plurality of non-overlapping segments; and in response to a determination that the time series data is divisible into the plurality of non-overlapping segments:

identify a current segment among the plurality of non-overlapping segments from the time series data; and determine an estimated network utilization based on a current regression model associated with the current segment to reduce an overuse or underuse of network utilization;

in response to a determination that the time series data cannot be divided into the plurality of non-overlapping segments:

determine an initial regression model for the time series data; and determine the estimated network utilization based on the initial regression model.

9. The non-transitory computer readable storage medium of claim 8, wherein the current regression model comprises a linear regression model.

10. The non-transitory computer readable storage medium of claim 8, wherein the current regression model is an autoregressive integrated moving average (AR1MA) model; a Holt-Winters model; or a Seasonal and Trend Decomposition Using Loess (STL) model.

11. The non-transitory computer readable storage medium of claim 8, wherein the current regression model is a Holt-Winters model.

12. The non-transitory computer readable storage medium of claim 8, wherein the current regression model is a Seasonal and Trend Decomposition Using Loess (STL) model.

13. The non-transitory computer readable storage medium of claim 8, wherein the current regression model indicates a trend of the current segment and indicates deviations from the trend of the current segment.

14. The non-transitory computer readable storage medium of claim 8, wherein each segment of the plurality of non-overlapping segments is associated with a different trend.

15. An apparatus, comprising:
one or more processors; and
a memory storing instructions, which when executed by the one or more processors, cause the one or more processor to:

obtain time series data comprising a plurality of network utilization measurements;

determine whether the time series data are divisible into a plurality of non-overlapping segments; and in response to a determination that the time series data is divisible into the plurality of non-overlapping segments:

identify a current segment among the plurality of non-overlapping segments from the time series data; and determine an estimated network utilization based on a current regression model associated with the current segment to reduce an overuse or underuse of network utilization;

in response to a determination that the time series data cannot be divided into the plurality of non-overlapping segments:

determine an initial regression model for the time series data; and determine the estimated network utilization based on the initial regression model.

16. The apparatus of claim 15, wherein the current regression model comprises a linear regression model.

17. The apparatus of claim 15, wherein the current regression model is an autoregressive integrated moving average (AR1MA) model; a Holt-Winters model; or a Seasonal and Trend Decomposition Using Loess (STL) model.

18. The apparatus of claim 15, wherein the current regression model is a Holt-Winters model.

19. The apparatus of claim 15, wherein the current regression model is a Seasonal and Trend Decomposition Using Loess (STL) model.

20. The apparatus of claim 15, wherein the current regression model indicates a trend of the current segment and indicates deviations from the trend of the current segment.

* * * * *